Feb. 23, 1965   R. M. JAMISON ETAL   3,170,965
AIR WASHER WITH MOVING CONE TO CONTROL VERTICAL DISTRIBUTION
Filed May 4, 1961

INVENTORS
ROBERT M. JAMISON
NICHOLAS J. PANZICA
BY
Curtis, Morris & Safford
ATTORNEYS

United States Patent Office 3,170,965
Patented Feb. 23, 1965

3,170,965
AIR WASHER WITH MOVING CONE TO CONTROL
VERTICAL DISTRIBUTION
Robert M. Jamison and Nicholas J. Panzica, Detroit, Mich., assignors to Ajem Laboratories, Inc., Livonia, Mich.
Filed May 4, 1961, Ser. No. 107,710
2 Claims. (Cl. 261—29)

This invention relates to removing contaminants, solid, liquid and/or gaseous from air or other gases, and to apparatus for and methods of generating a concentrated, but well distributed high velocity spray of liquid.

This invention is an improvement on the now well established type of air washers represented by prior Patents Nos. 2,599,202, 2,685,841, 2,789,866, in which a rapidly rotating impeller cage is fed a supply of liquid through one end, which is then hit by impact surfaces on the impeller and shattered into small "pellets" of the liquid which are accelerated by the impact with said surfaces and driven in an outward dynamic spray. Although such devices have proven highly effective and have come into wide and successful use, there is still room for improvement in efficiency.

We have now conceived that some lack of uniformity in the supply of liquid to the impact surfaces of the rotating cage has been responsible for impairment of efficiency and, accordingly, by the present invention we have combined, with the rotating impeller having impact surfaces associated with openings through which the liquid "pellets" are hurled, an improved spray generator and guide which distributes the liquid evenly over the area of said impact surfaces, thus making maximum use of the rotating impeller and assuring that all of the gas flowed past the cage will be subjected to full concentration and full impact energy of the liquid pellets which strike and entrain solid and liquid particles carried by the gas and, by virtue of the high concentration of small droplets and consequent large exposed surface, even gaseous contaminants are dissolved.

Immiscible contaminants, if desired, may be separated from the washing liquid by settling or filtering processes and recovered, and/or the working liquid recirculated.

The spray generator of this invention is well adapted for use in apparatus generally wherever a good distribution of liquid over band area is required. The overall apparatus including the rotating impeller is effective wherever a highly concentrated, uniformly distributed spray of high velocity liquid pellets is required. While the invention is hereinafter described as incorporated in a dust and fume collector, often called "air-washers," of the type described in the Emil Umbricht Patent 2,789,866, issued on April 23, 1957, it is to be understood that it is susceptible to numerous other applications which will be readily apparent to those skilled in the art.

The efficiency of air-washers of this type is determined, firstly, by the velocity or energy of the individual liquid pellets; secondly, by the concentration of the liquid pellets comprising the resulting spray pattern; thirdly, by the smallness of the droplet size; and, fourthly, by the distribution and also depth of the resulting spray pattern within a scrubbing area through which the contaminated air is directed.

In accordance with the principles of this invention a pair of conical guides are disposed one along each lip of an annular orifice of a liquid feed device through which liquid is forcibly ejected under pressure. These conical guides effectively control the egress pattern i.e. conical spread, of the washing liquid so as to be regularly distributed along substantially the entire extent of the impact portion of a rotating impeller.

In accordance with one illustrative embodiment of the invention, washing liquid under pressure is advantageously directed tangentially along the inner wall of a cylindrical liquid feed chamber having an annular orifice at one end juxtaposed with the feed port of a cage distributor, e.g., of the type shown in the above-identified Umbricht patent. The conical guides positioned along the inside lip and the outside lip, respectively, of the annular orifice guide and limit the escaping liquid to an area on the inside of the cage where it will be struck by impact surfaces, broken up into smaller droplets and accelerated outward through openings in the periphery of the cage.

If the washing liquid is directed tangentially along the inner wall of the cylindrical feed chamber, it acquires a circular component of flow. This is advantageously opposite to the direction of rotation of the cage distributor, so that the impact surfaces of the cage distributor strike against the drops of liquid wih a greater relative velocity whereby the impact breaks up the larger drops into liquid pellets and accelerates them to very high velocity.

The following detailed description is given in conjunction with the accompanying drawings wherein.

Figure 1:
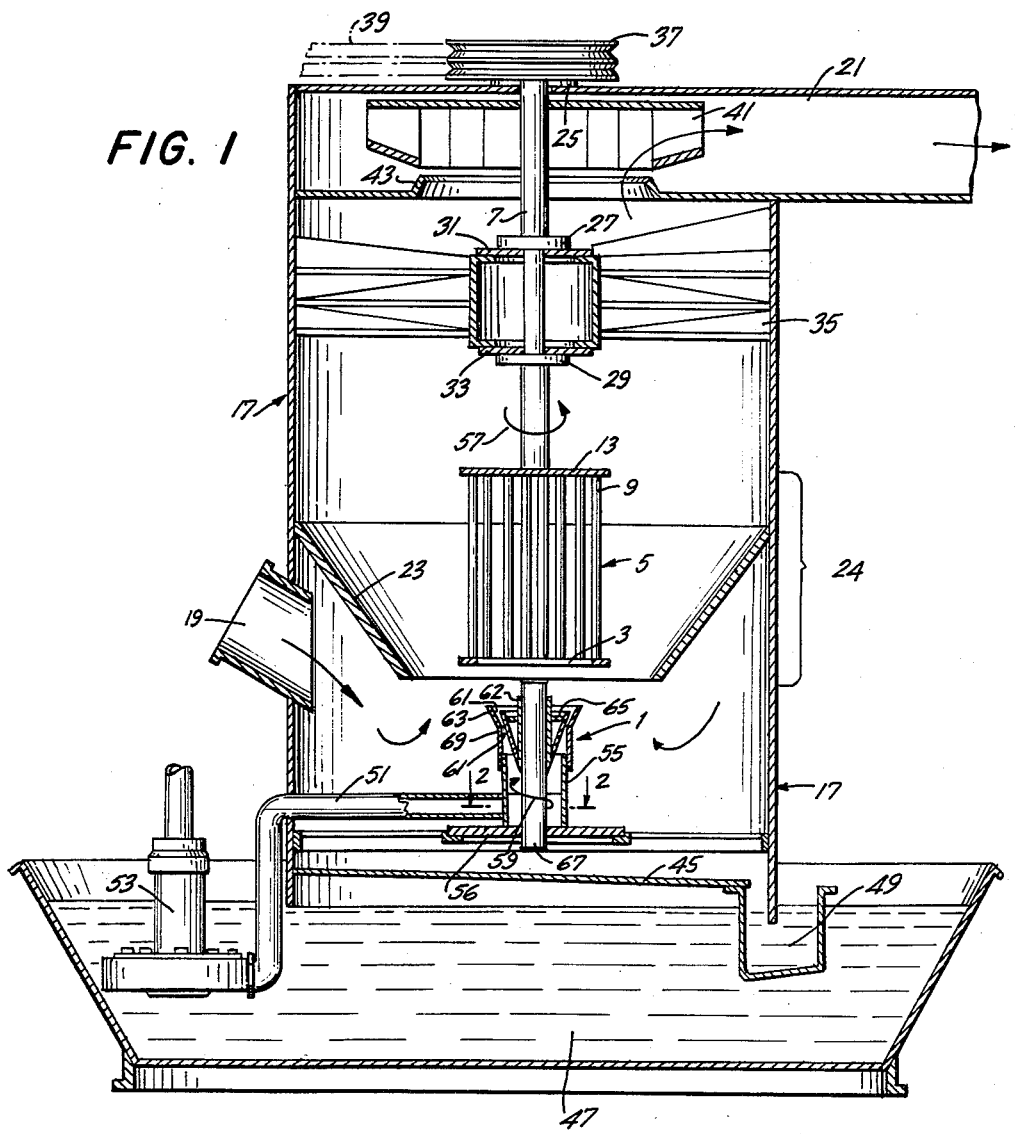
FIGURE 1 shows an axial sectional view of an air-washer embodying this invention.
Figure 2:
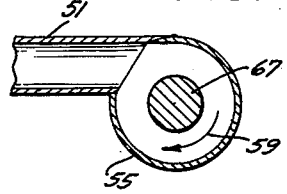
FIGURE 2 is a top plan view of a cylindrical liquid feed chamber taken on the line 2—2 of FIGURE 1.

As illustrated in FIGURE 1, the spray-generating system comprises a liquid feed device 1 for assuring uniform circumferential distribution of the incoming liquid in the example shown this is done by giving it a rotary swirl as it flows spirally upward toward a feed port 3 and is ejected therethrough into the open interior of cage impeller 5. A drive shaft 7 rotates the cage 5 about its longitudinal axis at a very high peripheral velocity.

The impeller 5 consists essentially of a structure capable of being rotated at high speed and at its periphery a series of impact surfaces each with an escape opening ahead of it in the direction of rotation, so that when coarse drops or jets of liquid start through the openings they will be struck by the impact surface and broken up into small liquid pellets which are accelerated and thrown off by the impact. This structure as shown is mounted on a drive shaft 7 and comprises a cylindrically arranged series of spaced rods 9, each providing on its lead face the impact surface referred to above and the spaces between them being the escape openings. These rods 9 are secured at their upper ends to a plate 13, which is secured to the drive shaft 7, and at their lower ends to a ring 15, the central opening of which is the feed port 3 of the cage 5.

The spray-generating system is axially positioned, within an air-washer coaxial with the cage 5. The air-washer shown comprises a substantially cylindrical outer housing 17 having an input duct 19 through which the contaminated air is introduced and an output duct 21 along which the washed air is discharged from the apparatus.

An input duct 19 directs the entering contaminated air against the bottom of conical baffle 23 which distributes it about the circumference of the housing 17 before passing through the drain-back from said baffle and on through the central opening of the baffle 23 and then over the periphery of the cage in the scrubbing zone 24 between the cage and the baffle 23.

The shaft 7 is rotatably mounted on bearings 25, 27 and 29. The bearing 25 is supported in the roof of the outer housing 17 and bearings 27 and 29 are supported on plates 31 and 33, respectively, which form part of a moisture eliminator multiple baffle system, generally indicated at 35. The baffle system 35 comprises a number of stationary deflectors which remove water particles carried along in the washed air from the scrubbing area 24. This baffle system extends from and is supported at the inner wall of the outer housing 17.

In operation, a sheave 37, keyed to the shaft 7, is driven by V-belt 39 from a motor (not shown) to rotate the cage 5 and also the impeller fan 41. The impeller fan 41 induces air flow in through duct 19, and upward through the scrubbing area 24, the baffle system 35, and the throat of an output baffle 43 and forces it outward along the output duct 21.

Meanwhile the liquid feed device 1 and cage 5 are projecting the high velocity liquid pellets which emanate from the periphetry of the cage 5 and pass in high concentration across the flow of contaminated air passing through the scrubbing area 24 where they collide with entrained air-borne contaminants encountered therein. The liquid with the entrained contaminants runs down the inner wall of the outer housing 17 and the baffle 23 and falls down from its edge through the entering air thus providing a first liquid curtain to wash said air.

An inclined bottom shed 45 may be provided in the housing 17 to catch the drain back before it goes to the reservoir 47 and divert it to a trough 49.

The trough 49 may serve as a settling basin to separate out contaminants before recirculating the liquid and merely overflow into the reservoir 47, the trough being cleaned of accumulated contaminants when necessary; but ordinarily the liquid from trough 49 will pass through a separator or clarifier, for example, filtering apparatus (not shown) of the type described in the Emil Umbricht Patent 2,833,417 to remove all contaminants from the liquid before it is recirculated.

The novel liquid feed device 1 of this invention provides a very effective initial spray or jet pattern of high velocity liquid thrown up in a uniformly distributed conical band. The liquid under pressure is supplied to the feed device 1 along a pipe 51 from a pump 53. As shown in FIGURE 2, the pipe 51 is connected tangentially to the wall of the liquid feed chamber 55. The feed chamber 55 is mounted on a base plate 56 supported by spokes extending from the wall of the housing 17.

The tangential feed of the liquid under pressure into the feed chamber 55, advantageously the liquid swirls about the inner chamber of the feed housing so that it acquires a component of flow opposite to the rotation of the shaft 7, as indicated by the arrows 57 and 59 in FIGURES 1 and 2; and, when this arrangement is used, it gives the liquid a centrifugal throw. In any case, the liquid is forcefully ejected through an annular discharge orifice 61, hereinafter defined, and toward the feed port 3 of the cage 5, as a conical stream. To limit the spread of this conical stream, the orifice 61 is flanked by a pair of conical guides 63 and 65 which are positioned one within the other at the upper end of the chamber 55.

As illustrated, the chamber 55 is fixedly positioned on the base plate 56 and is coaxial with the shaft 7. A pillar 67 may serve as the center support for the inner guide 62 so that no supports need extend across the path of the feed liquid where they would interfere with the uniformity of the spray pattern. The internal conical deflector 65 extends down into the chamber 55 so that it spreads the stream of swirling washing liquid gradually along the same conical path that it is following when discharged from the orifice 61. Substantially no liquid impinges upon the support disk 13, or the ring 15 but between these each part of each rod 9 receives substantially the same flow of the feed.

The external conical guide 63 includes a tubular portion 69 which telescopes over the chamber 55 and the inner guide 65 is slidable on pillar 67 to provide for fine adjustment to assure this uniformity of distribution. These conical guides are secured in adjusted position by usual means, e.g., by set screws, etc.

The total quantity of washing liquid forcibly ejected through the annular discharge orifice 61 is received within the rapidly rotating cage 5 as a uniform concial stream having a spiral flow component opposite to that of rapidly rotating cage and is uniformly distributed along the entire usable length of the dispersing rods 9. This uniform, controlled conical flow is useful in other processes and apparatus, but is especially adapted to supplying a cage type air washer as described above, the liquid so distributed being dispersed thereby as an effective high energy spray of very high velocity liquid pellets which traverses the full radial depth of the air around the periphery of the cage throughout the entire volume of the scrubbing area 24. Due to the very high velocity of these liquid pellets the air-borne contaminants are swept out of the air stream and carried to the outer wall where the liquid with entrained contaminants falls back; also due to the excellent uniformity of the spray and the high velocity of the liquid pellets, very little of the liquid is swept away by the air stream.

We claim:

1. An apparatus for generating a spray of high velocity liquid pellets which comprises a substantially cylindrical rotatable cage structure having a feed port at one end and a plurality of spaced dispensing surfaces around its periphery, means for directing liquid through said feed port and onto said dispensing surfaces over substantially their full length, said directing means having a substantially cylindrical inner chamber, an annular vent coaxial with said chamber and coaxial and juxtaposed with said feed port, means for supplying liquid under pressure tangentially into said chamber, whereby said liquid acquires a circular component of flow and is forcefully ejected through said annular vent as an annular conical stream, means for limiting the pattern for said stream between geometrically projected coaxial cones directed through said feed port, one extending from the outer periphery of said annular vent to said cage adjacent the ends of said dispensing surfaces near said feed port, and the other extending from the inner periphery of the annular vent to the opposite ends of said dispensing surfaces, whereby liquid projected from said directing means is distributed along the length of said dispersing surfaces, and means for rotating said cage structure in a direction opposite to that of said circular flow component in said chamber whereby said dispersing means impact and break up liquid fed thereto into pellets dispering and projecting them outwardly.

2. An apparatus of the type wherein airborne contaminants are to be bombarded with high velocity liquid pellets which comprises a housing, means for moving air through said housing, spray-producing means axially located within said housing and including a substantially cylindrical hollow rotatable cage structure having openings through its periphery for passage of liquid pellets and impact surfaces facing said openings at the rear thereof with respect to the direction of rotation, and having an open feed port at one end, means for rapidly rotating said cage, means for passing the air flow through the annular space between said cage means and the housing, a pair of conical guides coaxial and juxtaposed with said feed port and closely spaced from one another to form an annular orifice, said conical guides being disposed so that geometric projections of their surfaces form a pair of coaxial cones through said feed port subtending opposite ends of said impact surfaces, means for supplying liquid under pressure to said orifice to forcefully eject liquid therethrough and between said conical guides whereby substantially all of said liquid passes between said coaxial subtending geometric cones into said cage onto said impact surfaces along the lengths thereof, said impact surfaces being operative during said rotation to break up liquid fed thereto into small, high velocity, pellets and hurl them at high velocity across said air flow, whereby said airborne contaminants are contacted and entrained by said pellets and removed from the air, and means for collecting said pellets together with the removed contaminants.

References Cited in the file of this patent

UNITED STATES PATENTS 2,789,866     Umbricht _____ Apr. 23, 1957

FOREIGN PATENTS 920,117     Germany _____ Nov. 11, 1954
1,106,338     France _____ July 20, 1955